United States Patent
Fahey et al.

(10) Patent No.: US 11,608,182 B2
(45) Date of Patent: Mar. 21, 2023

(54) LATERAL SUPPORT SYSTEM FOR EJECTION SEAT

(71) Applicant: AMI Industries, Inc., Colorado Springs, CO (US)

(72) Inventors: Tyler Fahey, Woodland Park, CO (US); Glen Shaw, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 45 days.

(21) Appl. No.: 17/181,082

(22) Filed: Feb. 22, 2021

(65) Prior Publication Data

US 2021/0309380 A1  Oct. 7, 2021

Related U.S. Application Data

(60) Provisional application No. 63/006,548, filed on Apr. 7, 2020.

(51) Int. Cl.
*B64D 25/10* (2006.01)
*B64D 25/04* (2006.01)

(52) U.S. Cl.
CPC .............. *B64D 25/10* (2013.01); *B64D 25/04* (2013.01)

(58) Field of Classification Search
CPC ..................................................... B64D 25/10
See application file for complete search history.

(56) References Cited

U.S. PATENT DOCUMENTS

| 3,966,146 | A | * | 6/1976 | Roberts | B64D 25/04 244/122 A |
| 3,983,640 | A | * | 10/1976 | Cardullo | G09B 9/10 297/284.6 |
| 4,059,909 | A | * | 11/1977 | Kron | B64D 11/0689 297/180.12 |
| 4,321,044 | A | | 3/1982 | Kron | |
| 4,359,200 | A | | 11/1982 | Brevard et al. | |
| 4,899,961 | A | | 2/1990 | Herndon | |
| 5,301,903 | A | | 4/1994 | Aronne | |
| 5,427,331 | A | * | 6/1995 | Stroud | B64D 11/0689 244/122 AG |
| 6,055,473 | A | * | 4/2000 | Zwolinski | G01G 19/4142 701/45 |
| 6,209,159 | B1 | * | 4/2001 | Murphy | A47C 27/146 5/709 |
| 7,909,403 | B2 | | 3/2011 | Lawall et al. | |

(Continued)

OTHER PUBLICATIONS

United Kingdom International Property Office, United Kingdom Search Report dated Aug. 23, 2021 in Application No. GB2104023.3.

*Primary Examiner* — Richard G Davis
(74) *Attorney, Agent, or Firm* — Snell & Wilmer L.L.P.

(57) ABSTRACT

A lateral support system for use in an ejection seat of an aircraft may comprise a pump; a first side bladder fluidly coupled to the pump; a second side bladder fluidly coupled to the pump, the second side bladder configured to be disposed opposite the first side bladder. The first side bladder and the second side bladder may be coupled to a seat pan pad or a seat back pad. The lateral support system may further include a third side bladder and a fourth side bladder coupled to a seat pan pad, and the first side bladder and the second side bladder may be coupled to a seat back pad.

20 Claims, 5 Drawing Sheets

(56) References Cited

U.S. PATENT DOCUMENTS

| | | |
|---|---|---|
| 9,580,175 B2 | 2/2017 | Velasco et al. |
| 9,586,686 B2 | 3/2017 | Asli |
| 10,744,920 B2 * | 8/2020 | Strumolo ................. B60N 2/22 |
| 2018/0199729 A1 * | 7/2018 | Bullard .................. A47C 7/142 |
| 2020/0148366 A1 * | 5/2020 | Fagan ................ B64D 11/0619 |
| 2020/0238874 A1 * | 7/2020 | Mazzucchelli ........ B60N 2/914 |
| 2021/0394908 A1 * | 12/2021 | Klein .................... B64C 13/044 |

\* cited by examiner

LATERAL SUPPORT SYSTEM FOR EJECTION SEAT

CROSS-REFERENCE TO RELATED APPLICATIONS

This application is a non-provisional of, and claims priority to, and the benefit of U.S. Provisional Application No. 63/006,548, entitled "LATERAL SUPPORT SYSTEM FOR EJECTION SEAT," filed on Apr. 7, 2020, which is hereby incorporated by reference in its entirety.

FIELD

The present disclosure relates to aircraft ejection seats, and more specifically, to lateral support systems for aircraft ejection seats.

BACKGROUND

Ejection systems are designed to expel pilots from an aircraft cockpit. Ejection seats in high performance aircraft benefit from safely removing the pilot or other occupant from the disabled aircraft across a wide variety of aircraft speed regimes, altitudes and aircraft attitudes. Ejection seats may be uncomfortable for long flight missions, resulting in pilot fatigue.

SUMMARY

A lateral support system for use in an ejection seat of an aircraft is disclosed herein. The lateral support system may comprise: a pump; a first side bladder fluidly coupled to the pump; a second side bladder fluidly coupled to the pump, the second side bladder configured to be disposed opposite the first side bladder; a controller electrically coupled to the pump, the controller operable to command the pump to inflate at least one of the first side bladder and the second side bladder.

In various embodiments, the lateral support system may further comprise a seat pad, wherein the first side bladder, the second side bladder, and the seat pad are a monolithic component. The seat pad may be a seat back pad, and the first side bladder may be disposed on a first side of the seat back pad, and wherein the second side bladder is disposed on a second side of the seat back pad. The seat pad may be a seat pan pad, the first side bladder is disposed on a first side of the seat pan pad, and the second side bladder is disposed on a second side of the seat pan pad. The first side bladder may be configured to be coupled to a seat pad on a first side, and the second side bladder may be configured to be coupled to the seat pad on a second side. The seat pad may be at least one of a seat pan pad and a seat back pad for the ejection seat. The first side bladder and the second side bladder may each filled with an open-cell foam.

A lateral support system for use in an ejection seat of an aircraft is disclosed herein. The lateral support system may comprise: a seat back bolster system, comprising: a first side bladder configured to be coupled to a seat back pad of the ejection seat on a first side; and a second side bladder configured to be coupled to the seat back pad of the ejection seat on a second side, the second side opposite the first side; and a seat pan bolster system, comprising: a third side bladder configured to be coupled to a seat pan pad of the ejection seat on the first side; and a fourth side bladder configured to be coupled to the seat pan pad of the ejection seat on the second side.

In various embodiments, the lateral support system may further comprise the seat back pad and the seat pan pad. The first side bladder, the second side bladder, and the seat back pad may be a monolithic component. The lateral support system may further comprise a pump fluidly coupled to the first side bladder, the second side bladder, the third side bladder, and the fourth side bladder. The lateral support system may further comprise a controller coupled to the pump, the controller operable to: select a selection of bladders including at least one of the first side bladder, the second side bladder, the third side bladder, and the fourth side bladder to fluidly isolate from a remainder of bladders; and command the pump to inflate the selection of bladders. The first side bladder, the second side bladder, the third side bladder, and the fourth side bladder may each be filled with an open-cell foam. The first side bladder, the second side bladder, the third side bladder, and the fourth side bladder may each be air bladders.

An aircraft ejection seat is disclosed herein. The aircraft ejection seat may comprise: a seat pan extending from a first side to a second side; a seat pan pad coupled to the seat pan; a seat back coupled to the seat pan; a seat back pad coupled to the seat back; a first side bladder coupled to at least one of the seat pan pad and the seat back pad proximate the first side; and a second side bladder coupled to at least one of the seat pan pad and the seat back pad proximate the second side.

In various embodiments, the first side bladder may be coupled to the seat pan pad proximate the first side, and the second side bladder may be coupled to the seat pan pad proximate the second side. The aircraft ejection seat may further comprise a third side bladder coupled to the seat back pad proximate the first side, and a fourth side bladder coupled to the seat back pad proximate the second side. The first side bladder, the second side bladder, and the seat pan pad may be a monolithic component. The first side bladder may be coupled to the seat back pad proximate the first side, and the second side bladder may be coupled to the seat back pad proximate the second side. The first side bladder, the second side bladder, and the seat back pad may be a monolithic component.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Typical seat back cushions for ejection seats of aircraft ejection systems have minimal ergonomic features and may be uncomfortable for long flight missions. The minimal ergonomic and/or comfort features may lead to pilot fatigue during longer missions with high consecutive flight hour. Fatigue may result in a decrease in pilot concentration and performance during the longer missions. Typical ejection seat back cushions are a single component, non-adjustable, and/or non-adaptable. During an ejection, if the seat back and seat pan bolsters were engaged the pilots center of gravity may stay more centralized in relation to the seat, resulting in an ejection providing greater support for the pilot.

Disclosed herein, is a seat back bolster system and seat pan bolster system for use in an ejection seat and/or an aircraft ejection system. In various embodiments, the seat back bolster system and/or the seat pan bolster system may be adjustable and/or customizable. In this regard, the seat back bolster system and/or the seat pan bolster system may be adjusted manually and/or automatically to enhance a lateral support for an occupant. In various embodiments, seat back bolster system may comprise a first side bladder configured to be disposed opposite a second side bladder. The first side bladder and the second side bladder may be configured to be coupled to a seat back pad or integral with a seat back pad. Similarly, the seat pan bolster system may comprise a first side bladder configured to be disposed opposite a second side bladder. The first side bladder and the second side bladder may be configured to be coupled to a seat pan pad or integral with a seat pan pad.

Figure 1:
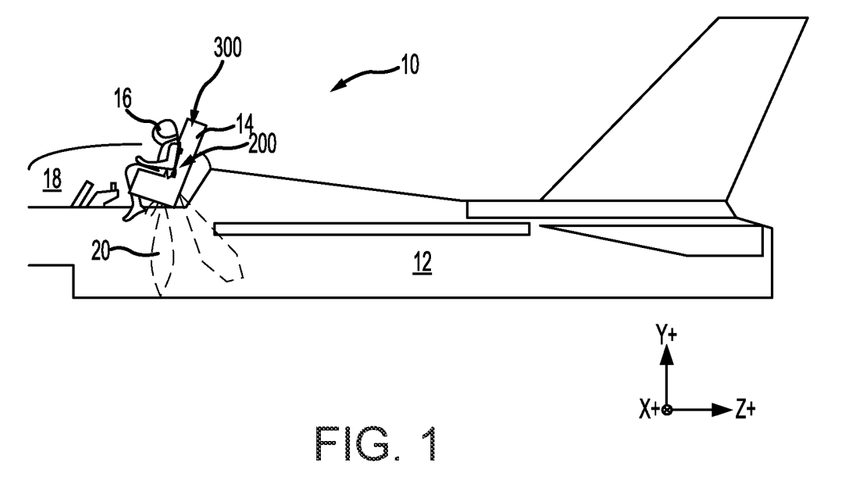
FIG. 1 illustrates an aircraft ejection system, in accordance with various embodiments.

With reference to FIG. 1, an aircraft ejection system 10 is shown, in accordance with various embodiments. Aircraft ejection system 10 may be installed in aircraft 12 to expel an ejection seat 14 and an occupant 16 of ejection seat 14 from a cockpit 18 of aircraft 12. Ejection seat 14 may be urged from cockpit 18 by a propulsion system 20. In accordance with various embodiments, ejection seat 14 includes a seat back bolster system 200 and a seat pan bolster system 300. The seat back bolster system 200 and the seat pan bolster system 300 may be coupled to, or integral with, a respective seat back pad or a respective seat pan pad. The seat back bolster system 200 and/or the seat pan bolster system 300 may be customizable for the occupant 16 and/or configurable to provide ergonomic relief to and/or lateral support for the occupant 16. In various embodiments, the seat back bolster system 200 and/or the seat pan bolster system 300 may be sized and configured to be retrofitted into a typical ejection seat.

Figure 2:
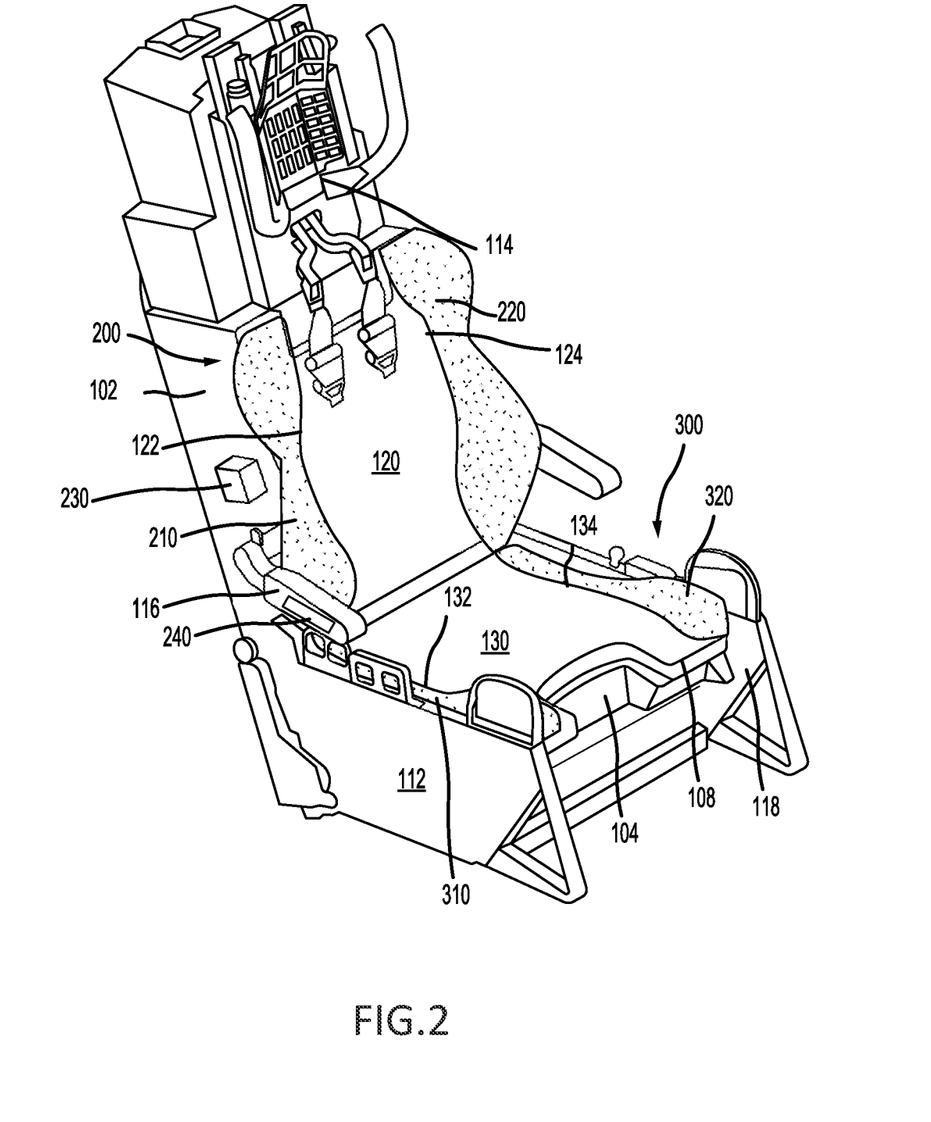
FIG. 2 illustrates an ejection seat having a lateral support system, in accordance with various embodiments.

Referring now to FIG. 2, an ejection seat 14 is illustrated with a seat back bolster system 200 and a seat pan bolster system 300, in accordance with various embodiments. Ejection seat 14 includes a seat back 102 and a seat pan 104. A seat back pad 120 may be coupled to seat back 102 and a seat pan pad 130 may be coupled to seat pan 104. In various embodiments, seat back pad 120 and/or seat pan pad 130 may comprise a seat cushion, or the like. In various embodiments, an ejection handle may be located proximate a first side 112 of seat pan 104, proximate a second side 118 of seat pan 104, proximate front 108 of seat pan 104, proximate headrest 114 of seat back 102, or the like. In various embodiments, the ejection handle may be a center ejection handle. In various embodiments, the ejection handle may be located anywhere that is accessible to an occupant of ejection seat 14.

Figure 5A:
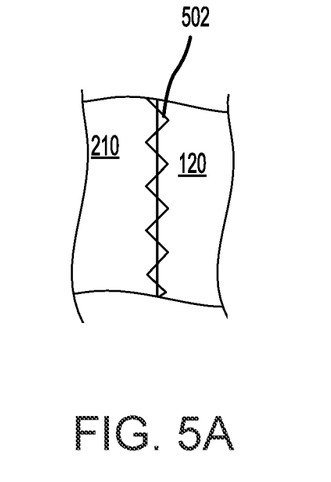
FIG. 5A illustrates an attachment between a lateral support and a perspective seat pad, in accordance with various embodiments.
Figure 5B:
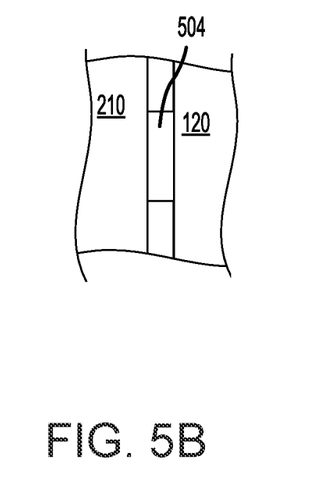
FIG. 5B illustrates an attachment between a lateral support and a perspective seat pad, in accordance with various embodiments.

In various embodiments, the seat back bolster system 200 comprises a first side bladder 210 and a second side bladder 220. The first side bladder 210 may be disposed proximate first side 112 of seat pan 104. The first side bladder 210 may be integral to the seat back pad 120. For example, in various embodiments, the first side bladder 210 the second side bladder 220, and the seat back pad 120 may be a monolithic component. In various embodiments, the first side bladder 210 may be a discrete component from the seat back pad 120 and/or the second side bladder 220 may be a discrete component from the seat back pad 120. In this regard, in various embodiments, the first side bladder 210 may be coupled to the seat back pad 120 at a first end 122 by a strap (e.g., strap 504 from FIG. 5B), by sewing (e.g., stitching 502 from FIG. 5A), or by any other coupling method, and the second side bladder 220 may be coupled to the seat back pad 120 at a second end 124 in a similar manner.

In various embodiments the seat back bolster system 200 further comprises a pump 230 in fluid communication with the first side bladder 210 and/or the second side bladder 220. The pump 230 may be configured to increase or decrease an air pressure in first side bladder 210 and/or second side bladder 220. The pump 230 may be in electrical communication with a controller 240. In various embodiments, the controller 240 may be disposed on an armrest 116 coupled to the seat back 102. Although controller 240 is illustrated as being disposed on the armrest 116, a controller integrated into a heads up display, or any other location is within the scope of this disclosure.

In various embodiments, the first side bladder 210 and the second side bladder 220 may each be air bladders (e.g., each bladder may be configured to inflate and/or deflate with air only. In various embodiments, the first side bladder 210 and the second side bladder 220 may be filled with open cell foam. In this regard, in various embodiments, the foam may expand when additional air is introduced into the bladder with open cell foam. The open-cell foam may also provide additional cushion relative to a seat pad only configuration.

In various embodiments, the seat pan bolster system 300 comprises a first side bladder 310 and a second side bladder 320. The first side bladder 310 may be disposed proximate first side 112 of seat pan 104. The first side bladder 310 may be integral to the seat pan pad 130. In various embodiments, the first side bladder 310, the second side bladder 320, and the seat pan pad 130 may be a monolithic component. In various embodiments, the first side bladder 310 may be a discrete component from the seat pan pad 130 and/or the second side bladder 320 may be a discrete component from the seat pan pad 130. In this regard, in various embodiments, the first side bladder 310 may be coupled to the seat pan pad 130 at a first end 122 by a strap, by sewing, or by any other coupling method, and the second side bladder 320 may be coupled to the seat pan pad 130 at a second end 124.

In various embodiments the seat pan bolster system 300 further comprises the pump 230 in fluid communication with the first side bladder 310 and/or the second side bladder 320. In various embodiments, the seat pan bolster system 300 may comprise a discrete pump from the seat back bolster system 200. The pump 230 may be configured to increase or decrease an air pressure in first side bladder 310 and/or second side bladder 320.

In various embodiments, the first side bladder 310 and the second side bladder 320 may each be air bladders (e.g., each bladder may be configured to inflate and/or deflate with air only). In various embodiments, the first side bladder 310 and the second side bladder 320 may be filled with open cell foam. In this regard, in various embodiments, the foam may expand when additional air is introduced into the bladder. The open-cell foam may also provide additional cushion relative to a seat pad only configuration.

In various embodiments, the pump 230 may be embedded in the seat back 102. Although illustrated as being embedded in the seat back 102, the pump 230 may be externally mounted, disposed below seat pan 104, or the like. In various embodiments, seat back bolster system 200 and seat pan bolster system 300 may comprise discrete pumps. In various embodiments, the seat back bolster system 200 and the seat pan bolster system 300 may comprise pump 230 only.

In various embodiments, a lateral support system for use on an ejection seat 14 of an aircraft 12 may comprise the seat back bolster system 200 and the seat pan bolster system 300. In this regard, in various embodiments, the seat back bolster system 200 and/or the seat pan bolster system 300 may provide an enhanced ejection posture for an occupant by allowing a spine of the occupant 16 to remain more parallel with a vertical centerline of ejection seat 14 from FIG. 1 during relatively high acceleration of an ejection.

Figure 3:
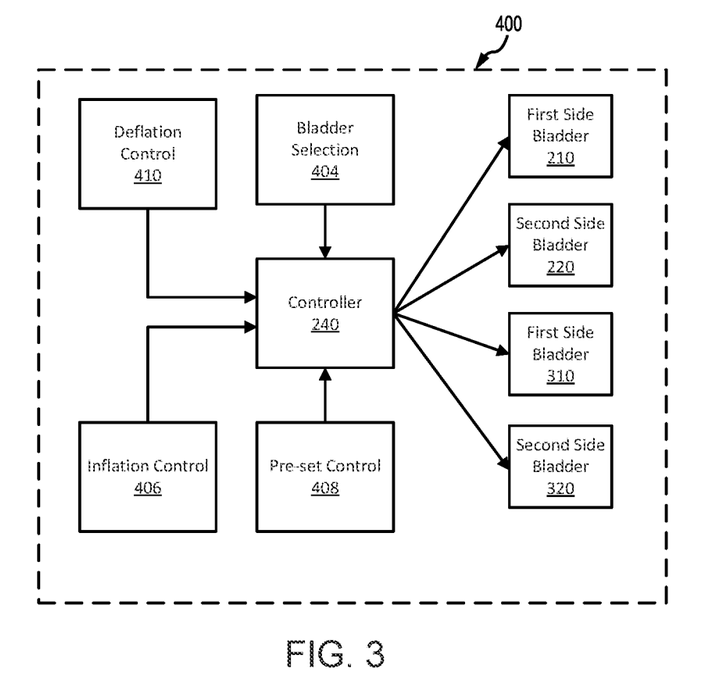
FIG. 3 illustrates a control system for a lateral support system, in accordance with various embodiments.

In various embodiments and with additional reference to FIG. 3, a schematic block diagram of a control system 400 for the seat back bolster system 200 and the seat pan bolster system 300 is illustrated. Control system 400 includes the controller 240 in electronic communication with the first side bladder 210 and the second side bladder 220 of the seat back bolster system 200 and the first side bladder 310 and the second side bladder 320 of the seat pan bolster system 300. In various embodiments, controller 240 may be integrated into computer systems onboard aircraft 12 and/or ejection seat 14. In various embodiments, controller 240 may be configured as a central network element or hub to access various systems, engines, and components of control system 400. Controller 240 may comprise a network, computer-based system, and/or software components configured to provide an access point to various systems, engines, and components of control system 400. In various embodiments, controller 240 may comprise a processor. In various embodiments, controller 240 may be implemented in a single processor. In various embodiments, controller 240 may be implemented as and may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. Controller 240 may comprise a processor configured to implement various logical operations in response to execution of instructions, for example, instructions stored on a non-transitory, tangible, computer-readable medium configured to communicate with controller 240.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, controller 240 may be in electronic communication with a bladder selection control 404, an inflation control 406, a deflation control 410, and/or a pre-set control 408. Each control (e.g., bladder selection control 404, inflation control 406, and/or pre-set control 408) may be disposed on armrest 116, on a cockpit display screen, or the like. Bladder selection control 404 may be configured to select a specific bladder in the seat back bolster system 200 (e.g., first side bladder 210 or second side bladder 220) and/or the seat pan bolster system 300 (e.g., the first side bladder 310 or the second side bladder 320). In response to selecting a bladder, the pump 230 may be fluidly coupled only to the selected bladder. In various embodiments, the bladder selection control 404 may include a bladder selection for all bladders to be fluidly coupled to the pump simultaneously.

Inflation control 406 may be configured to increase an air pressure in a specific bladder previously selected from bladder selection control 404 or all bladders. For example, in response to receiving an inflation command from the inflation control 406, the controller 240 may command the previously selected bladder from the bladder selection control 404 to inflate.

Deflation control 510 may be configured to decrease an air pressure in a specific bladder previously selected from bladder selection control 404 or all bladders. For example, in response to receiving an inflation command from the deflation control 410, the controller 240 may command the previously selected bladder from the bladder selection control 404 to deflate.

Pre-set control 408 may be configured to set an inflation level in each bladder in the and correlate the inflation level to a specific user. For example, an occupant may select the pre-set control 408 and provide an identification (e.g., a pin code, a RFID, or the like). Next, the occupant may inflate each bladder to a desired level. Then, the occupant may set the pre-set control 408 to have the desired level of inflation as a default inflation for future use. For example, the next time the occupant provides the identification, the bladders may inflate to the pre-set level from before in response to receiving the identification.

In various embodiments, the seat back bolster system 200 and/or the seat pan bolster system 300 may be configured to increase an occupant's comfort and/or ergonomics during operation of the aircraft 12 (from FIG. 1). In this regard, the seat back bolster system 200 and/or the seat pan bolster system 300 may be configured to decrease an occupant fatigue during long flight hours. In various embodiments, the seat back bolster system 200 and/or the seat pan bolster system 300 may enhance pilot health and longevity, safety, and/or performance during missions. In various embodiments, the seat back bolster system 200 and/or the seat pan bolster system 300 may provide enhanced lateral support of the occupant 16 from FIG. 1 during flight maneuvers and ejection events.

Figure 4:
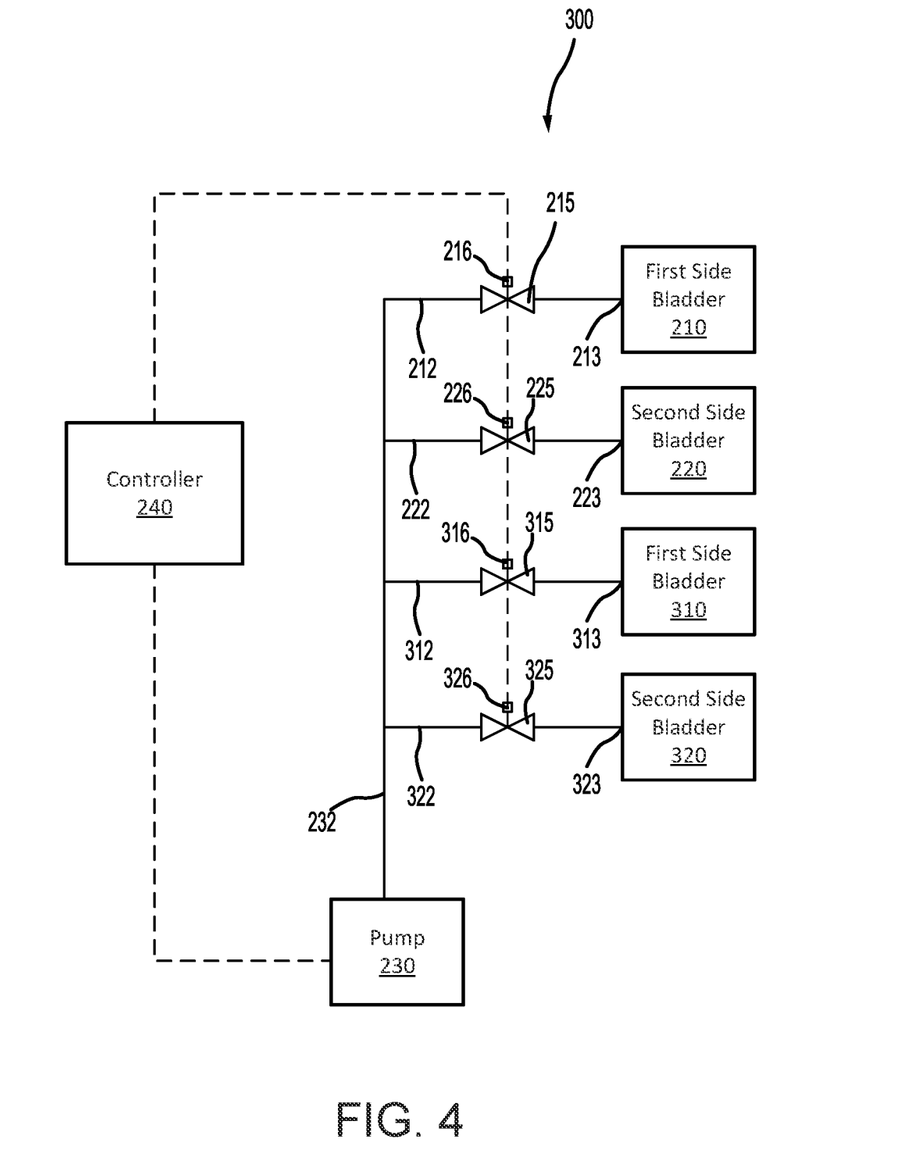
FIG. 4 illustrates a control system for a lateral support system, in accordance with various embodiments.

Referring now to FIG. 4, a schematic block diagram further defining control system 400 is illustrated, in accordance with various embodiments. In various embodiments, first side bladder 210, second side bladder 220, first side bladder 310, and second side bladder 320 may be in fluid communication with pump 230. In this regard, a main pump fluid line 232 may be fluidly coupled to a bladder specific line for each bladder. For example, a first fluid line 212 extends from main pump fluid line 232 to an inlet 213 of first side bladder 210, a second fluid line 222 extends from main pump fluid line to an inlet 223 of second side bladder 220, a third fluid line 312 extends from the main pump fluid line 232 to an inlet 313 of the first side bladder 310, and a fourth fluid line 322 extends from the main pump fluid line 232 to an inlet 323 of the second side bladder 320.

In various embodiments, an isolation valve is disposed between the main pump fluid line 232 to and each side bladder. For example, a first isolation valve 215 is disposed between the main pump fluid line 232 and the inlet 213 of the first side bladder 210, a second isolation valve 225 is disposed between the main pump fluid line 232 and the inlet 223 of the second side bladder 220, a third isolation valve 315 is disposed between the main pump fluid line 232 and the inlet 313 of the first side bladder 310, and a fourth isolation valve 325 is disposed between the main pump fluid line 232 and the inlet 323 of the second side bladder 220.

In various embodiments, an actuator is coupled to each isolation valve. For example, a first actuator 216 is coupled to the first isolation valve 215, a second actuator 226 is coupled to the second isolation valve 225, a third actuator 316 is coupled to the third isolation valve 315, and a fourth actuator 326 is coupled to the third isolation valve 325. Each actuator may be configured to actuate a respective isolation valve open or close. Each actuator may be in electrical communication with controller 240. In this regard, in various embodiments, in response to an occupant (e.g., occupant 16 from FIG. 1) selecting first side bladder 210 to be inflated, controller 210 may send a command signal to first actuator 216 to open first isolation valve 215 and a command signal to a remainder of actuators (e.g., second actuator 226, third actuator 316, and fourth actuator 326) to close their respective isolation valves.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A lateral support system for use in an ejection seat of an aircraft, comprising:
   a pump;
   a first side bladder fluidly coupled to the pump;
   a second side bladder fluidly coupled to the pump, the second side bladder configured to be disposed opposite the first side bladder;

a controller electrically coupled to the pump, the controller operable to command the pump to inflate at least one of the first side bladder and the second side bladder; and a pre-set control in electronic communication with the controller, the first side bladder and the second side bladder each being configured to inflate to a pre-set level in response to the pre-set control receiving an identification input, the identification input including one of a pin code and a radio frequency identification (RFID) input.

2. The lateral support system of claim 1, further comprising a seat pad, wherein the first side bladder, the second side bladder, and the seat pad are a monolithic component.

3. The lateral support system of claim 2, wherein the seat pad is a seat back pad, and wherein the first side bladder is disposed on a first side of the seat back pad, and wherein the second side bladder is disposed on a second side of the seat back pad.

4. The lateral support system of claim 2, wherein the seat pad is a seat pan pad, wherein the first side bladder is disposed on a first side of the seat pan pad, and wherein the second side bladder is disposed on a second side of the seat pan pad.

5. The lateral support system of claim 1, wherein the first side bladder is configured to be coupled to a seat pad on a first side, and wherein the second side bladder is configured to be coupled to the seat pad on a second side.

6. The lateral support system of claim 5, wherein the seat pad is at least one of a seat pan pad and a seat back pad for the ejection seat.

7. The lateral support system of claim 1, wherein the first side bladder and the second side bladder are each filled with an open-cell foam.

8. A lateral support system for use in an ejection seat of an aircraft, comprising:
a controller;
a seat back bolster system, comprising:
a first side bladder configured to be coupled to a seat back pad of the ejection seat on a first side; and
a second side bladder configured to be coupled to the seat back pad of the ejection seat on a second side, the second side opposite the first side; and
a seat pan bolster system, comprising:
a third side bladder configured to be coupled to a seat pan pad of the ejection seat on the first side; and
a fourth side bladder configured to be coupled to the seat pan pad of the ejection seat on the second side; and
a pre-set control in electronic communication with the controller, the first side bladder, the second side bladder, the third side bladder and the fourth side bladder each being configured to inflate to a pre-set level in response to the pre-set control receiving an identification input, the identification input including one of a pin code and a radio frequency identification (RFID) input.

9. The lateral support system of claim 8, further comprising the seat back pad and the seat pan pad.

10. The lateral support system of claim 9, wherein the first side bladder, the second side bladder, and the seat back pad are a monolithic component.

11. The lateral support system of claim 8, further comprising a pump fluidly coupled to the first side bladder, the second side bladder, the third side bladder, and the fourth side bladder.

12. The lateral support system of claim 11, wherein the controller is coupled to the pump, the controller operable to:
select a selection of bladders including at least one of the first side bladder, the second side bladder, the third side bladder, and the fourth side bladder to fluidly isolate from a remainder of bladders; and
command the pump to inflate the selection of bladders.

13. The lateral support system of claim 8, wherein the first side bladder, the second side bladder, the third side bladder, and the fourth side bladder are each filled with an open-cell foam.

14. The lateral support system of claim 8, wherein the first side bladder, the second side bladder, the third side bladder, and the fourth side bladder are each air bladders.

15. An aircraft ejection seat, comprising:
a controller;
a seat pan extending from a first side to a second side;
a seat pan pad coupled to the seat pan;
a seat back coupled to the seat pan;
a seat back pad coupled to the seat back;
a first side bladder coupled to at least one of the seat pan pad and the seat back pad proximate the first side;
a second side bladder coupled to at least one of the seat pan pad and the seat back pad proximate the second side; and
a pre-set control in electronic communication with the controller, the first side bladder and the second side bladder each being configured to inflate to a pre-set level in response to the pre-set control receiving an identification input, the identification input including one of a pin code and a radio frequency identification (RFID) input.

16. The aircraft ejection seat of claim 15, wherein the first side bladder is coupled to the seat pan pad proximate the first side, and wherein the second side bladder is coupled to the seat pan pad proximate the second side.

17. The aircraft ejection seat of claim 16, further comprising a third side bladder coupled to the seat back pad proximate the first side, and a fourth side bladder coupled to the seat back pad proximate the second side.

18. The aircraft ejection seat of claim 16, wherein the first side bladder, the second side bladder, and the seat pan pad are a monolithic component.

19. The aircraft ejection seat of claim 15, wherein the first side bladder is coupled to the seat back pad proximate the first side, and wherein the second side bladder is coupled to the seat back pad proximate the second side.

20. The aircraft ejection seat of claim 19, wherein the first side bladder, the second side bladder, and the seat back pad are a monolithic component.

* * * * *